US009509220B2

United States Patent
Cohen

(10) Patent No.: US 9,509,220 B2
(45) Date of Patent: Nov. 29, 2016

(54) BI-MODAL VOLTAGE CONVERTER

(71) Applicant: Texas Instruments Incorporated, Dallas, TX (US)

(72) Inventor: Isaac Cohen, Dix Hills, NY (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 64 days.

(21) Appl. No.: 14/587,132

(22) Filed: Dec. 31, 2014

(65) Prior Publication Data

US 2015/0214846 A1 Jul. 30, 2015

Related U.S. Application Data

(60) Provisional application No. 61/931,324, filed on Jan. 24, 2014, provisional application No. 62/083,701, filed on Nov. 24, 2014.

(51) Int. Cl.
*H02M 3/335* (2006.01)

(52) U.S. Cl.
CPC ..... *H02M 3/33507* (2013.01); *H02M 3/33569* (2013.01)

(58) Field of Classification Search
CPC ........ H02M 5/10; H02M 5/257; H02M 3/22; H02M 3/33569; H02M 3/33538; H02M 3/33515; H02M 3/33507; H02M 3/33546
See application file for complete search history.

(56) References Cited

U.S. PATENT DOCUMENTS

| | | | | | |
|---|---|---|---|---|---|
| 5,436,521 | A | * | 7/1995 | Kataoka | H02N 2/0075 310/317 |
| 5,694,304 | A | * | 12/1997 | Telefus | H02M 1/38 363/20 |
| 6,707,690 | B1 | | 3/2004 | Bottrill | |
| 8,767,417 | B2 | * | 7/2014 | Lin | H02M 3/3353 363/21.12 |
| 2009/0262558 | A1 | * | 10/2009 | Zheng | H02M 3/33569 363/20 |
| 2010/0039840 | A1 | * | 2/2010 | Bahai | H02J 7/022 363/65 |
| 2012/0106214 | A1 | * | 5/2012 | Liu | H02M 3/33569 363/97 |

OTHER PUBLICATIONS

"BiCMOS PFC/PWM Combination Controller," Datasheet, Texas Instruments Incorporated, 2001, www.ti.com.

\* cited by examiner

*Primary Examiner* — Jessica Han
*Assistant Examiner* — Bart Iliya
(74) *Attorney, Agent, or Firm* — William B. Kempler; Chares A. Brill; Frank D. Cimino

(57) ABSTRACT

A bi-modal voltage converter and associated method for reducing stress on secondary rectifiers and decreasing switching losses. An embodiment of the voltage converter comprises three switches and control circuitry that is operative, upon a determination with respect to the input voltage, to select between a two-switch operation and a three-switch operation. When the input voltage is greater than a threshold value, one of the three switches is permanently turned on, while the other two switches are controlled using a pulse-width modulated (PWM) signal. When the input voltage is equal to or less than the threshold value (e.g., requiring a duty cycle greater than 50%), all three switches are controlled by the PWM signal.

15 Claims, 5 Drawing Sheets

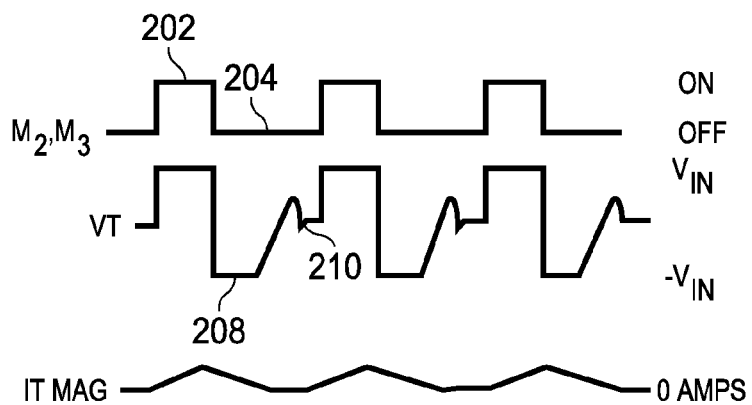
FIG. 2
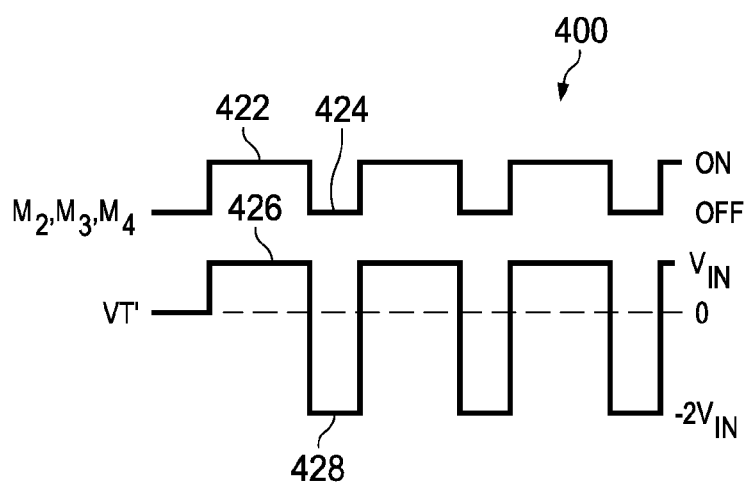
FIG. 4
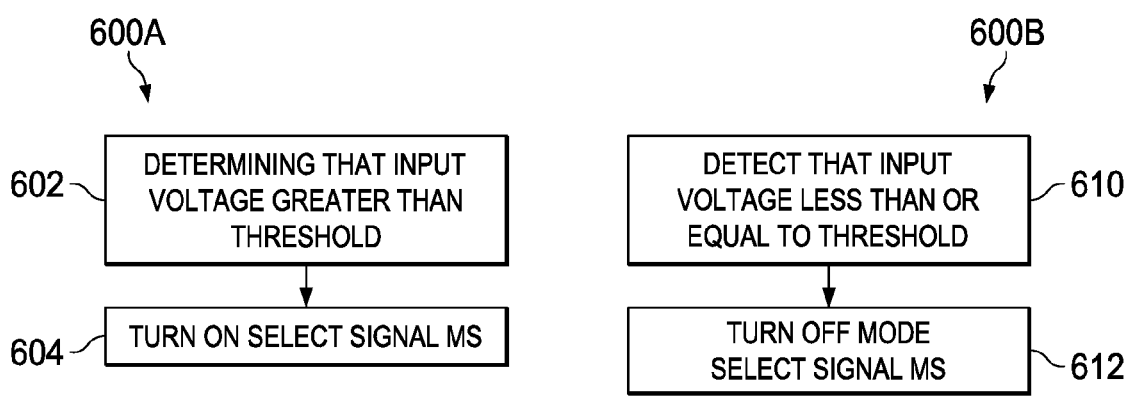
FIG. 6A
FIG. 6B

BI-MODAL VOLTAGE CONVERTER

CLAIM OF PRIORITY AND RELATED PATENT APPLICATIONS

This nonprovisional application claims priority based upon the following prior U.S. provisional patent application(s): (i) "BI-MODAL FORWARD CONVERTER," Application No. 61/931,324, filed Jan. 24, 2014, in the name(s) of Isaac Cohen; and (ii) "BI-MODAL FORWARD CONVERTER," Application No. 62/083,701, filed Nov. 24, 2014, in the name(s) of Isaac Cohen; each of which is hereby incorporated by reference in its entirety.

FIELD OF THE DISCLOSURE

Disclosed embodiments relate generally to the field of power conversion.

BACKGROUND

Power converters are electrical devices that are used to convert one voltage to another voltage. In most instances, they take a variable voltage and convert that voltage to a fixed voltage. In the case of the topologies discussed herein, the converters do this by varying the duty cycle of the power switches. If the input voltage decreases, the control circuit increases the ON time of the transistor switches so that the output remains at the desired voltage.

One of the topologies used in converting power from one voltage to another is the forward converter. In this topology, a primary side voltage is applied across a winding of a transformer and through that a voltage is induced in the secondary of the transformer. The voltage across the primary is applied and removed by cycling switches. The alternating application and removal of the primary voltage causes a DC voltage to appear on the secondary of the transformer. This voltage is rectified, filtered, and applied to a load across the output. When the switches are on, the voltage VIN across the primary of the transformer leads to a build-up of magnetizing current within the transformer. To prevent failure of the transformer, this magnetizing current must be reset to zero during the OFF portion of the cycle.

Another topology used in power conversion is the fly-back converter. In this topology, when a voltage is applied across a primary winding of a transformer, the primary current and magnetic flux increases, storing energy in the transformer, but no voltage is able to flow in the secondary winding due to a reverse-biased diode. When the voltage is removed from the primary winding, the primary current and magnetic flux drops. The secondary voltage is reversed, forward-biasing the diode and allowing current to flow from the transformer.

SUMMARY

The present patent application discloses methods and devices for reducing stress on secondary rectifiers and reducing switching losses in voltage conversion. Rather than requiring a forward converter or a fly-back converter to operate solely as a two-switch converter or else as a three-switch converter, the disclosed methods and devices operate bi-modally and can switch between operation as a two-switch converter and operation as a three-switch converter based on the input voltage VIN or a related parameter. A threshold value is set that ensures that when the input voltage is high enough that the associated duty cycle will remain below 50%, a mode select signal is turned ON. In this first mode, the third switch on the primary side of the transformer remains ON while the other two switches follow a pulse-width modulated (PWM) signal and the converter operates as a two-switch converter. When the input voltage drops to a level that will require a duty cycle greater than 50%, the mode select signal is turned OFF. In this second mode, the third switch will operate in unison with the other two switches in the circuit and the converter operates as a three-switch converter. Using the disclosed methods, the voltage rating of the third switch is reduced, switching losses are decreased and voltage stress on the output rectifiers is reduced.

In one aspect, an embodiment of a method of operating a voltage converter is disclosed for a voltage converter having a first switch connected between a first terminal of an input voltage source and a first section of a primary winding of a transformer, a second switch connected between a second section of the primary winding of the transformer and a second terminal of the input voltage source, and a third switch connected between the first section and the second section of the primary winding. The method includes determining if the input voltage is greater than a threshold value; and responsive to determining that the input voltage is greater than the threshold value, turning the third switch ON while controlling the first switch and the second switch using a pulse-width modulated signal.

In another aspect, an embodiment of a voltage converter is disclosed. The voltage converter includes a first switch connected between a first terminal of an input voltage source and a first section of a primary winding of a transformer; a second switch connected between a second section of the primary winding of the transformer and a second terminal of the input voltage source; and a third switch connected between the first section and the second section of the primary winding. Appropriate control circuitry or logic is operative to switch operation of the voltage converter between a two-switch operation and a three-switch operation responsive to a determination relative to a value of the input voltage source. For example, when the input voltage is greater than a threshold value, the third switch is turned ON while the first switch and the second switch are controlled using the PWM signal in the two-switch mode. On the other hand, when the input voltage is less than or equal to the threshold (e.g., requiring a >0.5 duty cycle), the all three switches are controlled by using the PWM signal.

In yet another aspect, an embodiment of a fly-back voltage converter is disclosed. The voltage converter includes a first switch connected between a first terminal of an input voltage source and a primary winding of a first transformer; a second switch connected between a primary winding of a second transformer and a second terminal of the input voltage source; and a third switch connected between the primary winding of the first transformer and the primary winding of the second transformer, wherein appropriate control circuitry or mode selection logic is operative to provide selection between a two-switch mode and a three-switch mode depending the input voltage similar to the embodiment above.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

FIG. 2 depicts waveforms associated with the forward converter of FIG. 1;

FIG. 4 depicts waveforms associated with the forward converter of FIG. 3;

FIGS. 6A and 6B depict a method of switching between a two-switch and a three-switch converter according to an embodiment of the present disclosure.

DETAILED DESCRIPTION OF THE DRAWINGS

Specific embodiments of the invention will now be described in detail with reference to the accompanying Figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 1:
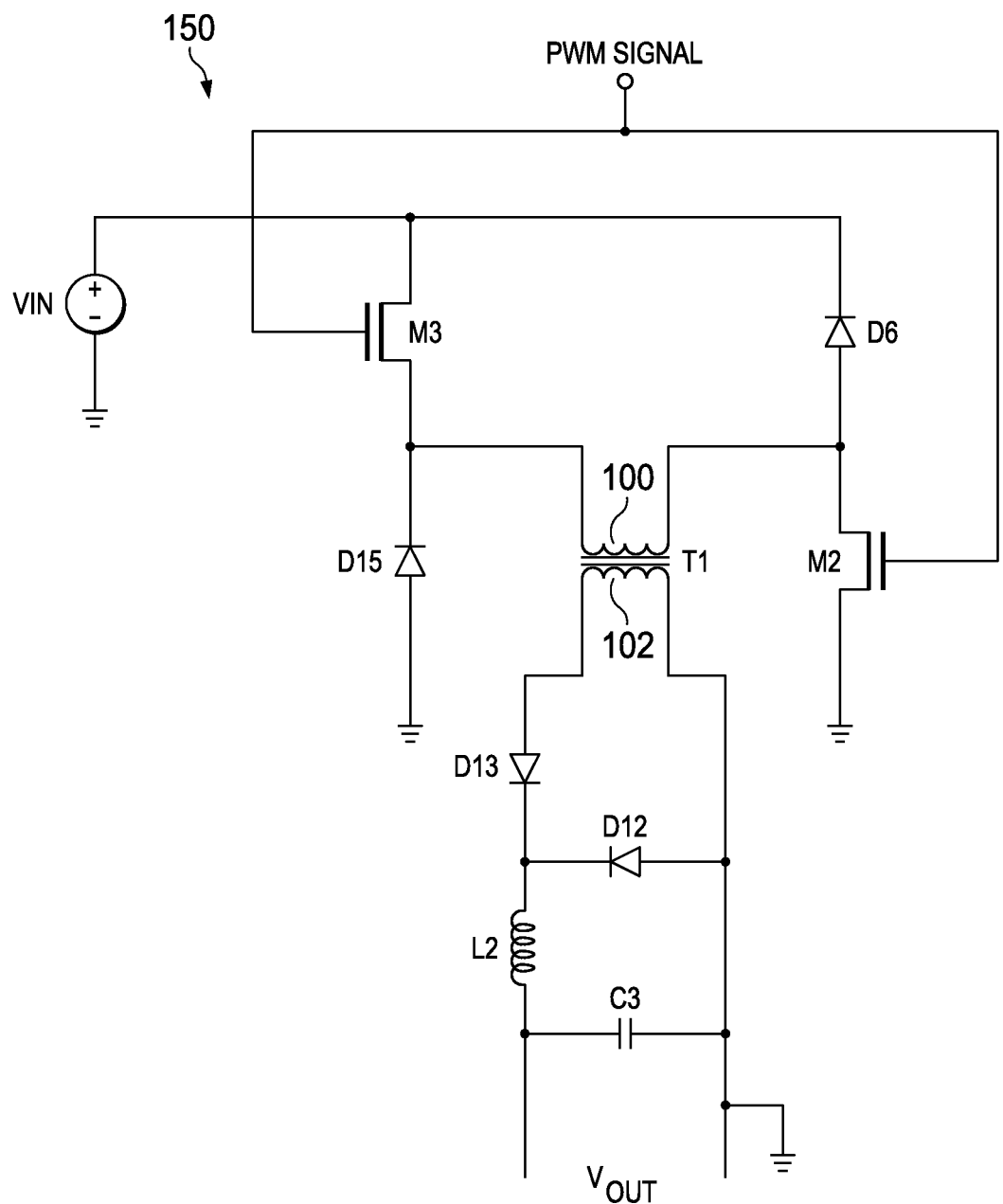
FIG. 1 depicts an example of a two-switch forward converter as known in the art.

Referring now to the drawings and more particularly to FIG. 1, a two-switch forward converter 150 as known in the art is disclosed. Switch M3 is connected between voltage source VIN and a first terminal of primary winding 100 of transformer T1, while switch M2 is connected between a second terminal of primary winding 100 and a reference terminal of the voltage source VIN, e.g., ground. Diode D15 is disposed between the primary winding 100 and the reference voltage and is coupled to a common node of switch M3 and primary winding 100 of transformer T1. Diode D6 is tied to a common node between switch M2 and primary winding 100 and connected to voltage source VIN. On the secondary side of the circuit, a first terminal of secondary winding 102 of transistor T1 is connected to output signal VOUT via diode D13 and inductor L2. The second terminal of secondary winding 102 is connected to the reference voltage, e.g., ground. Diode D12 is disposed between the reference voltage and a common node between diode D13 and L2. A capacitor C3 is disposed between the output signal VOUT and its reference terminal. Input voltage VIN is applied across the primary winding 100 of transformer T1 when the two switches implemented by transistors M2 and M3 are closed, which induces a voltage across the secondary winding 102 of transistor T1. Transistors M2 and M3 are controlled by pulse-width modulated signal PWM, which is generated by any number of known methods, such that both switches are ON or both are OFF. When both M2 and M3 are ON, the voltage on primary 100 of transformer T1 is equal to input voltage VIN and induces a voltage on the secondary 102. The voltage induced on the secondary winding is rectified by diode D13 and filtered through filter L2 and C3, resulting in the output voltage VOUT.

During the period when voltage VIN is applied across the primary coils, an increasing load current is present; voltage VIN also leads to a build-up of magnetizing current within the transformer during this period. When the switches are opened, the load current ceases but the magnetizing current continues to flow until it is discharged and the voltage across the transformer reverses. As seen in FIG. 1, the magnetizing current is unable to flow through open switches M2, M3; instead the reversed voltage forward biases diodes D15 and D6 and the magnetizing current is returned to the input source. It is known that this magnetizing current must be fully discharged in a cycle for the transformer to function properly over a long period of time. That is, the input voltage multiplied by the time the input voltage is applied must equal the negative voltage during the OFF-cycle multiplied by the time the input voltage is off, giving a voltage-time integral over an entire cycle of zero. For the two-switch transformer shown in FIG. 1, if VIN is the input voltage, TM1 is the time the switches are closed and TM2 is the time the switches are open, then VIN times TM1 must equal or be less than −VIN times TM2. This limits the duty-cycle of the two-switch forward converter to 50% or less for stable operation.

FIG. 2 shows several timing diagrams 200 for the forward converter of FIG. 1 when operating at a duty-cycle less than 50%. In the embodiment shown in FIG. 2, the duty cycle is 33%. Transistors M2 and M3 are ON for an ON-interval 202 lasting for one-third of the cycle and they are OFF for an OFF-interval 204 lasting two-thirds of the cycle. The voltage VT across the primary of transformer T1 is equal to input voltage VIN during the ON-interval 202. For approximately an equal time period 208, VT is equal to the negative of VIN. VT then returns to approximately zero, except for some ringing of the signal, for the remainder of the cycle 210. Hence, the voltage-time integral for VT over one cycle is zero. The current ITMAG shows the magnetizing current waveform during the same period.

Figure 3:
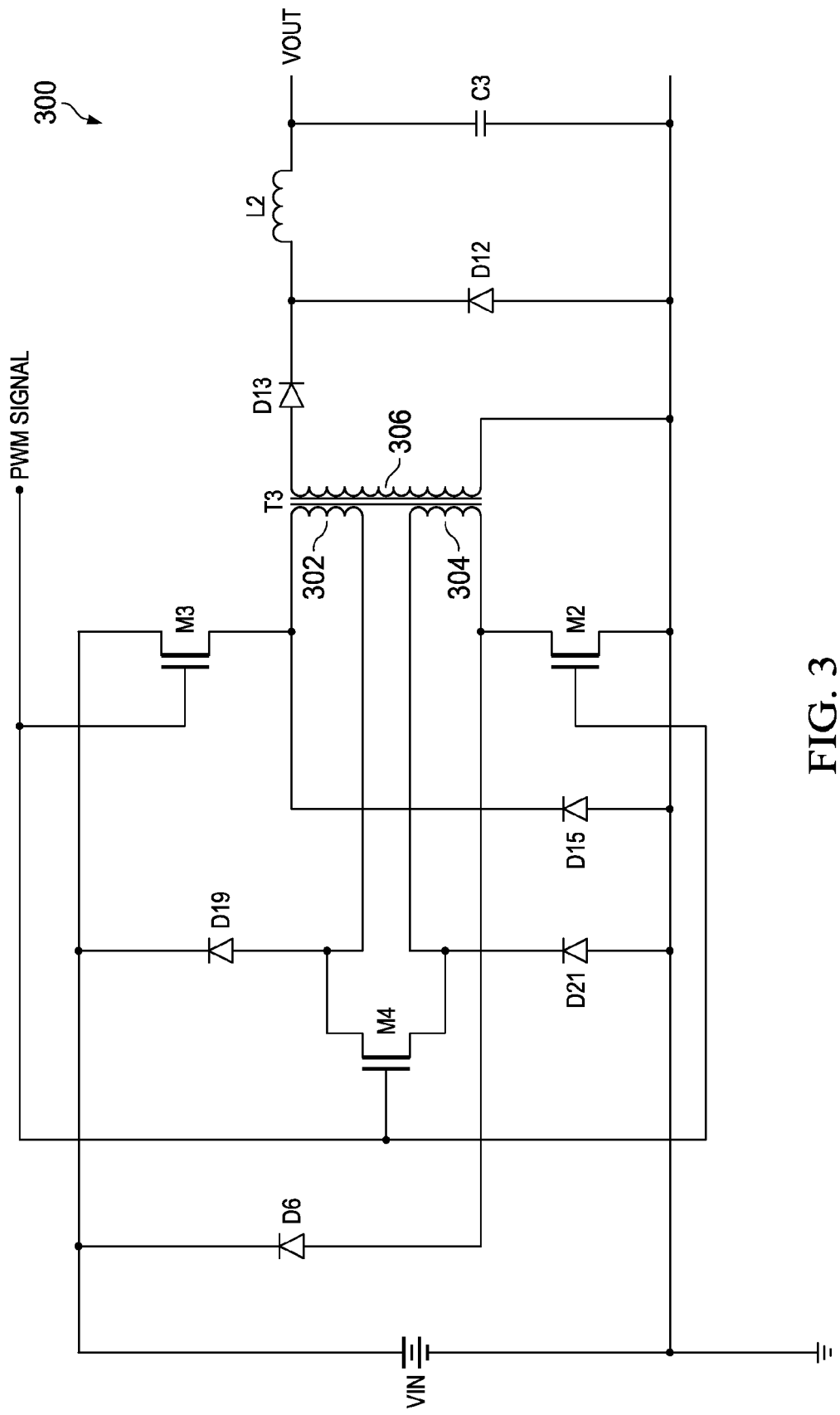
FIG. 3 depicts an example of a three-switch forward converter as known in the art.

Commonly owned U.S. Pat. No. 6,707,690 to Bottrill, which is incorporated by reference in its entirety, discloses a modification to the two-switch forward converter of FIG. 1, the three-switch forward converter. An example of the three-switch forward converter 300 is shown in FIG. 3. The circuit of FIG. 3 is similar to the circuit shown in FIG. 1, with a few important changes. More specifically, the primary side of transformer T3 is split into two winding sections 302, 304 and a third switch M4 is disposed between the two sections 302, 304 of transformer T3. Diodes D19 and D21 are also added as noted below. Switch M3 is disposed between voltage source VIN and a terminal of primary winding section 302 (e.g., a first section or segment) of transformer T3. Switch M2 is disposed between section 304 of the primary winding (e.g., a second section or segment) and a reference terminal of the voltage source VIN, i.e., ground. Diode D15 is disposed between the section 302 of the primary winding and the reference voltage rail and is coupled to a common node of switch M3 and section 302 of the primary winding of transformer T3. Diode D19 is disposed between section 302 of the primary winding and input voltage VIN and is connected to switch M4. Diode D21 is disposed between the reference voltage and section 304 of the primary winding of transformer T3 and is connected to switch M4. Diode D6 is disposed between a terminal of section 304 of the primary winding and input voltage VIN and is connected to switch M2.

On the secondary side of the converter circuit 300, a first terminal of secondary winding 306 of transformer T3 is connected to output signal VOUT via diode D13 and inductor L2. The second terminal of secondary winding 306 is connected to the reference voltage rail, i.e., ground. Similar to the converter circuit 150 shown in FIG. 1, diode D12 is disposed between the reference voltage and a common node between diode D13 and L2. Likewise, capacitor C3 is disposed between the output signal VOUT and its reference terminal. As illustrated in FIG. 3, accordingly, the input voltage VIN is applied across the primary winding sections 302, 304 of transformer T3 via switching transistors M2, M3, and M4, which are connected in series with the segments of the primary winding. Further, switching transistors M2, M3 and M4 may be controlled in tandem by PWM signal, which can be generated and controlled by any number of known methods.

Switches M2, M3 and M4 are controlled such that they are all ON or all OFF. When switches M2, M3 and M4 are all turned ON, the voltage across transformer T3 is equal to an input voltage VIN. As in the earlier example, input voltage VIN applied across T3 causes an increasing load current to flow in T3 and a build-up of magnetizing current within the transformer, the latter of which must be discharged during the OFF phase. When M2, M3 and M4 are turned OFF, the magnetizing current continues to flow and the voltage across the windings is reversed. This reverse voltage increases until the diodes conduct and the magnetizing current returns to the power source from the separate segments 302, 304 of the primary winding. In the case of winding section 302, the current flows from the lower rail through D15, winding 302 and D19 to the upper rail. In the case of winding 304, the current flows from the lower rail through D21, winding 304 and D6 to the upper rail. Since the magnitude of the magnetizing current remains the same during the transition from the ON interval to the OFF interval, the voltage across each winding 302, 304 equals −VIN during the OFF-interval and the effective voltage across T3 is −2VIN during the OFF-interval. Each winding section however experiences only the input voltage VIN across it, because switch M4 isolates the windings 302, 304. With an effective doubling of the reverse voltage, the negative portion of the voltage-time integral is satisfied in half the time of the positive portion.

The timing diagrams 400 of FIG. 4 illustrates the operation of this embodiment when operating at a duty cycle of greater than 50%, in this illustration 66%. Transistors M2, M3 and M4 are ON for an ON-interval 422 that is two-thirds of the cycle and are OFF for an OFF-interval 424 that is one-third of the cycle. The voltage VT' across the transformer T3 during the ON-interval 422 equals VIN 426. During OFF-interval 424, each winding 302, 304 has a voltage equal to −VIN across it, so that the effective voltage across transformer T3 is equal to −2VIN 428. The voltage-time integral of VT' over a complete cycle (422 and 424) totals zero exactly as the cycle ends.

During the OFF phase of the PWM signal, the primary side of a three-switch voltage converter discharges the magnetizing current twice as fast as in a two-switch converter. This means that on the secondary side of the voltage converter the diodes of the three-switch voltage converter are subjected to the voltage 2VIN. It should be appreciated that the use of a three-switch configuration during periods when the input voltage is high places unnecessary stress on these secondary diodes. Additionally, because transistor M4 is operating across the entire range of input voltages, transistor M4 must have the same voltage rating as do transistors M2 and M3.

In accordance with the teachings of the present disclosure, switching between a two-switch mode and a three-switch mode may be advantageously effected depending on the input voltage levels, thereby alleviating excessive voltage stresses and unnecessary switching losses. In an example implementation, when the input voltage is at or near a level (e.g., when the voltage is low) that requires a duty cycle of greater than 50%, the voltage converter may be operated as a three-switch converter. On the other hand, when the input voltage is sufficiently high (i.e., duty cycle of less than 50%, for example), a two-switch mode of operation may be selectively implemented.

Figure 5:
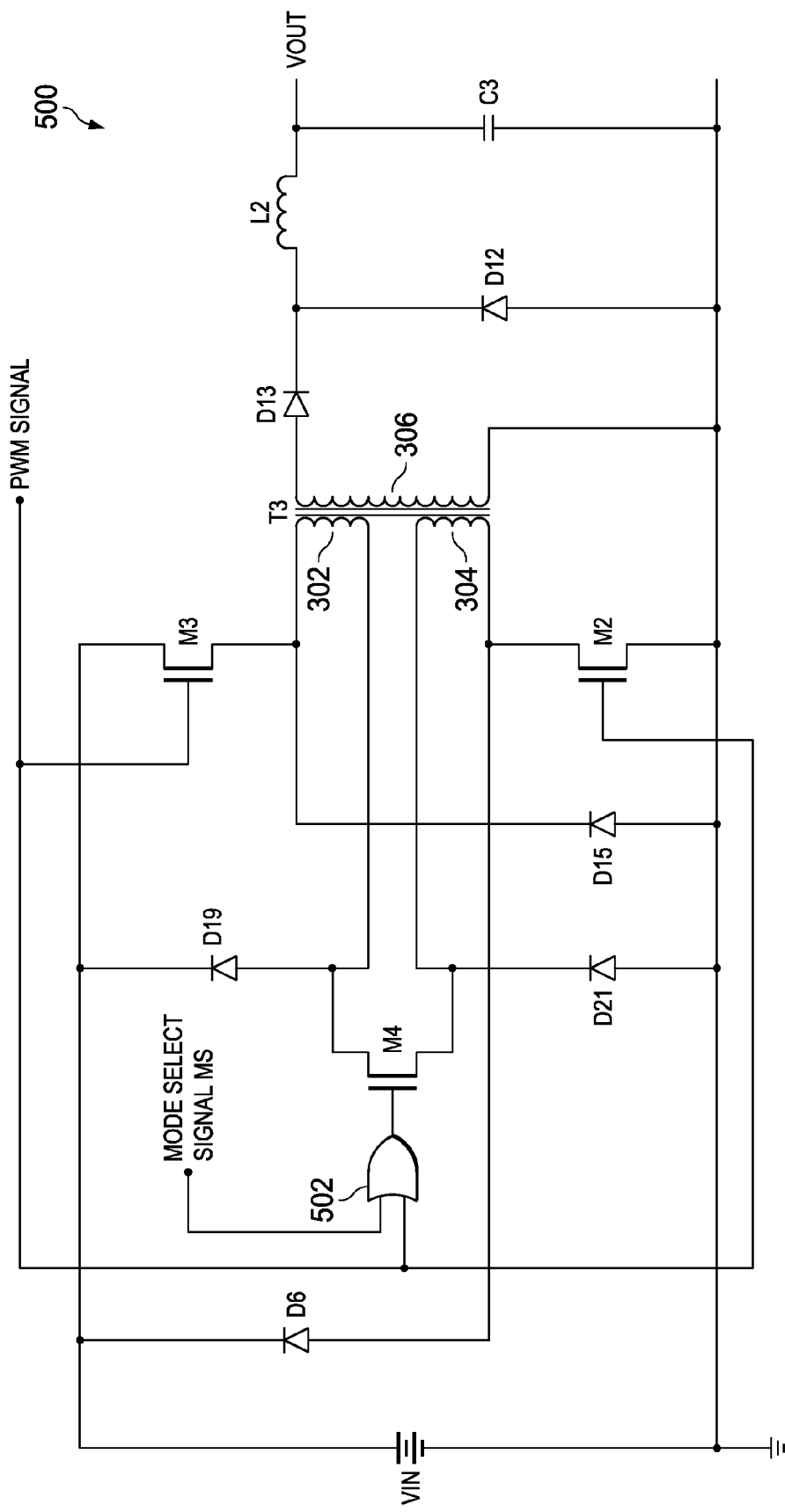
FIG. 5 depicts an example of a bi-modal forward converter according to an embodiment of the present disclosure.

FIG. 5 shows an embodiment of a bi-modal forward converter 500, i.e., one that can operate as either a two-switch forward converter or a three-switch forward converter. In this embodiment, the circuit of FIG. 5 is substantially similar to the circuit of FIG. 3, with appropriate control circuitry involving a mode select signal MS and logic circuitry 502 provided for control of a third switch. Broadly, a first switch M3 is connected between a first terminal of an input voltage source, e.g., the high rail, and a first section 302 of the primary winding of transformer T3. A second switch M2 is connected between a second section 304 of the primary winding of transformer T3 and a second terminal of the input voltage source, e.g., ground or other reference voltage rail. A third switch M4 is connected between the first section 302 and the second section 304 of the primary winding of transformer T3. Other components of circuit 500 (e.g., diodes, inductors, capacitors, etc) are coupled to operate in a manner substantially similar to the corresponding components shown in the circuit 300 of FIG. 3. Accordingly, the description of FIG. 3 is equally applied here, mutatis mutandis.

In the embodiment shown in FIG. 5, logic circuit 502, which controls switch M4, is shown as an OR gate that combines mode select signal MS with PWM signal for selective control of M4. On the other hand, transistors M2 and M3 remain solely under the control of the PWM signal. One skilled in the art will recognize that other logic gates may be implemented to achieve functional equivalence for controlling M4 or other switches in further embodiments, which may be realized as suitable transistors, e.g., MOSFET, JFET, BJT, and the like. During operation of the circuit, the mode select signal is turned ON when the duty cycle is less than 50%, so that the forward converter performs as a two-switch converter, and the mode select signal is turned OFF when the duty cycle is greater than 50%, causing the forward converter to perform as a three-switch forward converter.

Operation of the example bi-modal forward converter 500 is discussed with reference to FIG. 5, which illustrates an embodiment of the circuit, and to FIGS. 6A and 6B, which provide a flowchart of a switching methodology. Control of the mode select signal may be based on the input voltage received or a related parameter. For example, depending on the specific design of the forward converter, a threshold value may be set for the input voltage. Illustratively, one of the switches (e.g., M4) is permanently ON when the input voltage is high enough (i.e., greater than the threshold value) to allow output voltage regulation with a duty cycle of less than or equal to 50% (i.e., a 0.5 duty cycle). M4 is PWM-modulated in unison with switches M3 and M2 when the input voltage drops below the threshold value that requires operation at a duty cycle greater than 0.5. Accordingly, the threshold value may be set to ensure that when the duty cycle required to maintain the desired output is less than or equal to 50%, the mode select signal will be ON. It is not important that this threshold value is set to coincide exactly with a duty cycle of 50%; but it must ensure that the mode select signal is ON if the necessary duty cycle is to be maintained. In at least some embodiments, the threshold value may be set to an input voltage that requires a duty cycle substantially less than 0.5, for example, a 48% duty cycle. Neither is the timing of the switchover from two-switch operation to three-switch operation critical; a duration of several milliseconds is an acceptable figure depending on the particular voltage converter application.

Accordingly, it should be appreciated that tolerances on the mode select circuit are not critical in the implementation of a forward converter circuit according to an embodiment of the present invention. Referring to FIG. 6A, appropriate control circuitry associated with the voltage converter, e.g., forward converter 500, (not specifically shown) determines if the input voltage is greater than the threshold value (block 602). Responsive to determining that the input voltage is greater than a threshold, the control circuitry turns ON or otherwise asserts mode select signal MS (block 604), which turns on transistor M4. On the other hand, transistors M2, M3 continue to turn on and off in response to the PWM signal. In this first mode, the voltage converter performs as a two-switch forward converter. That is, when the PWM signal is high, voltage VIN is applied across transformer T3 and load current flows through primary segments 302, 304 and switches M2, M4, M3. The application of voltage VIN also leads to a build-up of magnetizing current within transformer T3. Then, when the PWM signal is low, transistors M2, M3 turn OFF, but transistor M4 remains ON due to mode select signal MS being high. The magnetizing current continues to flow through primary segments 302, 304 and switch M4 and the voltage across T3 is reversed. Diodes D15 and D6 become forward biased, connecting T3 to the upper and lower rails and the current is returned to the voltage source. Diodes D19 and D21 remain reverse biased and have no effect on the operation of the circuit. The waveforms corresponding to this first mode will be the same as the waveforms shown in FIG. 2.

Turning next to FIG. 6B, as the voltage converter continues to operate, the control circuitry (not specifically shown) determines if the input voltage (or a related parameter) is less than or equal to the threshold value (block 610). Responsive to detecting that the input voltage is less than or equal to the threshold value, the control circuitry turns OFF or otherwise de-asserts the mode select signal MS (block 612). In this second mode, all three switches M2, M3, M4 operate in response to the PWM signal and the voltage converter performs as a three-switch forward converter. That is, when the PWM signal is high, all three switches are ON and load current flows through primary segments 302, 304 and switches M2, M3, M4. At the same time, the application of voltage VIN also leads to a build-up of magnetizing current within transformer T3. Then when the PWM signal is low, all three switches M3, M4, M2 are OFF. The magnetizing current continues to flow through primary segments 302 and 304 and the voltage across each of these segments is reversed, but the current is not able to move through the open switches. Diodes D15 and D19 become forward biased and connect primary segment 302 to the power rails, returning the magnetizing current from segment 302 to the voltage source. Similarly, diodes D21 and D6 become forward biased and connect primary segment 304 to the power rails, returning the magnetizing current from primary segment 304 to the voltage source.

Figure 7:
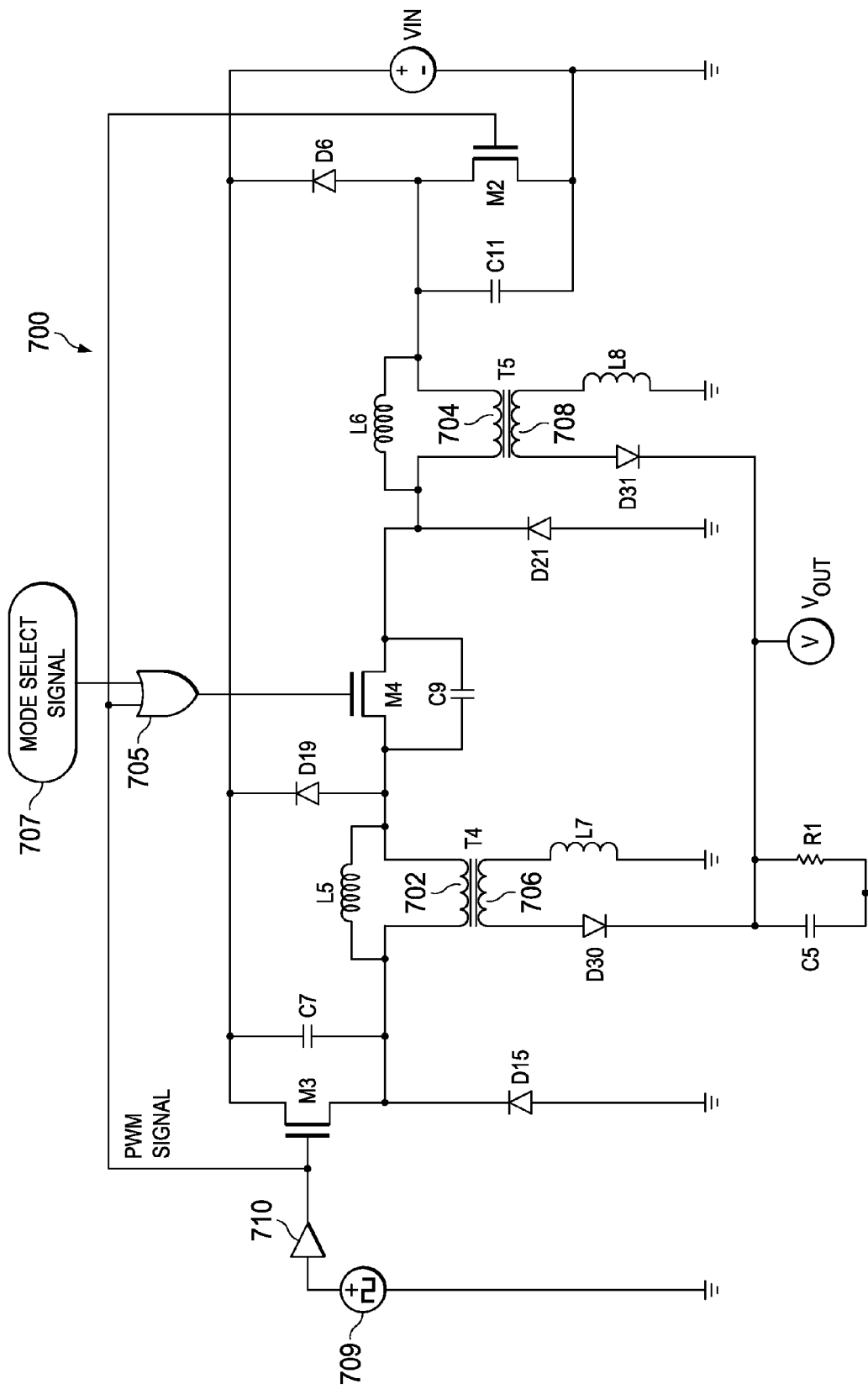
FIG. 7 depicts an example of a bi-modal fly-back converter according to an embodiment of the present disclosure.

The embodiments disclosed thus far have been directed to a forward converter. However, the inventive concepts disclosed herein are not limited to a forward converter but can also be utilized in a fly-back converter, an example of which is illustrated in FIG. 7. In the example embodiment shown as fly-back converter 700, the split transformer of FIGS. 3 and 5 is replaced by two transformers T4, T5, with switch M3, transformer T4, switch M4, transformer T5 and switch M2 being connected in series between power source VIN and a reference potential, e.g., ground. It will be understood that transformers T4, T5 can also be replaced by a single transformer having a split primary winding and achieve the same advantages. Each of switches M3, M4, M2 has a corresponding capacitor C7, C9, C11 connected in parallel with the switch. Similarly, the primary winding 702 of transformer T4 is connected in parallel with inductor L5 and the primary winding 704 of transformer T5 is connected in parallel with inductor L6. The connections for diodes D15, D19, D21, D6 are substantially similar to the connections for the same diodes in the forward converter 500 described hereinabove. That is, diode D15 is disposed between the reference voltage, i.e., ground and primary winding 702 of transformer T4 and is also connected to switch M3. Diode D19 is disposed between primary winding 702 of transformer T4 and input voltage VIN and is connected to switch M4. Diode D21 is disposed between the reference voltage and primary winding 704 of transformer T5 and is connected to switch M4. Diode D6 is disposed between input signal VIN and primary winding 704 of transformer T5 and is connected to switch M2. A source signal 709 propagated via a suitable logic component 710 is operative to provide a PWM signal for purposes of the fly-back converter disclosed herein. As before, PWM signal is provided to control switches M2, M3. Similar to converter operation described previously, mode select signal MS and the PWM signal are mediated via suitable logic 706, which is shown in this Figure as an OR gate, to control switch M4. On the secondary side of the circuit, one terminal of secondary winding 706 of transformer T4 is connected to the reference voltage via inductor L7. The other terminal of the secondary winding 706 of transformer T4 is connected to output signal VOUT via diode 30. Capacitor C5 and resistor R1 are each connected between the reference voltage, i.e., ground, and nodes common to diode D30 and output signal Vo. A first terminal of secondary winding 708 of transformer T5 is connected to the reference voltage via inductor L8. A second terminal of secondary winding 708 of transformer T5 is connected output signal VOUT via diode D31.

It can be seen that the primary side of the converter 700 operates substantially in the same manner as in a forward converter, with the operation of the secondary side performing in the manner of a fly-back converter, rather than as a forward converter. In operation, the third switch M4 receives input from logic circuit 705, which in the Figure is shown as an OR gate. However, it will be understood that other logic circuits can provide the same functionality, with the inputs being are the PWM signal and a mode select signal MS provided by suitable MS logic 707. The use of this additional logic circuit 705 allows the fly-back converter to receive the same benefits from bi-modal operation as were mentioned in the forward converter. The specific embodiment disclosed in FIG. 7 also illustrates another scenario in which bi-modal operation is useful, wherein, rather than having a single transformer with split primary winding sections, two separate transformers T4 and T5 are provided. This embodiment can also benefit from the use of bi-modal operation to lower switching losses and to decrease stress on the secondary diodes. The specific operation of the fly-back converter is not discussed herein, as one skilled in the art will be familiar with these details.

Although various embodiments have been shown and described in detail, the claims are not limited to any particular embodiment or example. Additionally, whereas various circuit components (e.g., diodes, transistors, inductors, capacitors, resistors, etc.,) may be similarly labeled in Drawing Figures in different embodiments, they may not necessarily be identical and may be designed with different values and operational parameters that are specific to a particular voltage converter implementation. Moreover, example voltage converter embodiments including appropriate mode selection control logic may be implemented as integrated circuits for use in power converter assemblies and applications. Also, none of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A method of operating a voltage converter having a first switch connected between a first terminal of an input voltage source and a first section of a primary winding of a transformer, a second switch connected between a second section of the primary winding of the transformer and a second terminal of the input voltage source, and a third switch connected between the first section and the second section of the primary winding, the method comprising:
   determining if the input voltage is greater than a threshold value; and
   responsive to determining that the input voltage is greater than the threshold value, turning the third switch ON while controlling the first switch and the second switch using a pulse-width modulated signal.

2. The method as recited in claim 1, further comprising:
   determining if the input voltage is equal to or less than the threshold value; and
   responsive to determining that the input voltage is equal to or less than the threshold value, controlling the first, the second, and the third switches using the pulse-width modulated signal.

3. The method as recited in claim 1, wherein the threshold value is set to a predetermined value that requires a duty cycle equal to or less than 50%.

4. The method as recited in claim 1, wherein the method is operable at a forward converter.

5. The method as recited in claim 1, wherein the method is operable at a fly-back converter.

6. A voltage converter comprising:
   a first switch connected between a first terminal of an input voltage source and a first section of a primary winding of a transformer;
   a second switch connected between a second section of the primary winding of the transformer and a second terminal of the input voltage source;
   a third switch connected between the first section and the second section of the primary winding; and
   control circuitry operative to switch operation of the voltage converter between a two-switch operation and a three-switch operation responsive to a determination relative to a value of the input voltage source.

7. The voltage converter as recited in claim 6, wherein when the input voltage is greater than a threshold value, the control circuitry is operative to turn on the third switch while the first and second switches are controlled using a pulse-width modulated (PWM) signal.

8. The voltage converter as recited in claim 6, wherein when the input voltage is equal to or less than a threshold value, a mode select signal provided to the control circuitry is deactivated and the first, the second, and the third switches are controlled using the PWM signal.

9. The voltage converter as recited in claim 6, wherein a threshold value for the input voltage is set to a predetermined value that requires a duty cycle equal to or less than 50%.

10. The voltage converter as recited in claim 6, wherein the voltage converter comprises a forward converter.

11. A fly-back voltage converter comprising:
    a first switch connected between a first terminal of an input voltage source and a primary winding of a first transformer;
    a second switch connected between a primary winding of a second transformer and a second terminal of the input voltage source;
    a third switch connected between the primary winding of the first transformer and the primary winding of the second transformer; and
    control circuitry operative to switch operation of the fly-back voltage converter between a two-switch operation and a three-switch operation responsive to a determination relative to a value of the input voltage source.

12. The fly-back voltage converter as recited in claim 11, wherein when the input voltage is greater than a threshold value, the control circuitry is operative to turn on the third switch while the first and second switches are controlled using a pulse-width modulated (PWM) signal.

13. The fly-back voltage converter as recited in claim 11, wherein when the input voltage is equal to or less than the threshold value, a mode select signal provided to the control circuitry is deactivated and the first, the second, and the third switches are controlled using the PWM signal.

14. The fly-back voltage converter as recited in claim 11, wherein a threshold value for the input voltage is set to a predetermined value that requires a duty cycle equal to or less than 50%.

15. The fly-back voltage converter as recited in claim 11, wherein the control circuitry is operative to facilitate turning ON the third switch while allowing the first and second switches to turn ON and OFF together when the input voltage is higher than a threshold value.

* * * * *